(12) United States Patent
Pukkila

(10) Patent No.: US 7,006,811 B2
(45) Date of Patent: Feb. 28, 2006

(54) METHOD AND APPARATUS FOR SWITCHING ON AND OFF INTERFERENCE CANCELLATION IN A RECEIVER

(75) Inventor: Markku Pukkila, Espoo (FI)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 10/375,591

(22) Filed: Feb. 27, 2003

(65) Prior Publication Data

US 2004/0171364 A1    Sep. 2, 2004

(51) Int. Cl.
*H04B 1/06*    (2006.01)

(52) U.S. Cl. .................. 455/278.1; 455/273; 455/296; 375/346; 375/347

(58) Field of Classification Search ............. 455/226.1, 455/78, 88, 296, 273, 278.1, 134, 137, 295, 455/63, 167.11, 423, 302, 308, 61, 150.1, 455/161.3, 222, 226.2, 277.2; 375/346, 344, 375/345, 374, 229, 267, 343, 103, 348, 148, 375/240, 278, 284, 350; 370/208, 319, 333, 370/344, 468, 480
See application file for complete search history.

(56) References Cited

U.S. PATENT DOCUMENTS 5,822,380 A * 10/1998 Bottomley .................. 375/347
2005/0111596 A1 * 5/2005 Olsson et al. ............... 375/346

OTHER PUBLICATIONS

Jeong Ko et al., 0-7803-4788-Sep. 1998, IEEE, 1998, pp. 719-722, a symbol by symbol based adaptiveinterference canceller for asynchronous DS/CDMA systems in multipath fading channels.*
*3rd Generation Partnership Project; Technical Specification Group GSM/EDGE Radio Access Network; Radio transmission and reception (Release 6)*, 3GPP TS 45.005 V6.0.0 (Nov. 2002).
*Wireless Cochannel Interference Cancelling*, Wireless Personal Communications, No. 19, pp. 37-55; 2001, Klower Academic Press.

* cited by examiner

*Primary Examiner*—Edward F. Urban
*Assistant Examiner*—Charles Chow
(74) *Attorney, Agent, or Firm*—Ware, Fressola, Van Der Sluys & Adolphson LLP

(57) ABSTRACT

A method of operation of a receiver of a mobile station or a base station of a radio access network and corresponding equipment, the method for use in providing interference cancellation according to a single antenna interference cancellation (SAIC) algorithm without degrading performance in case of little or no interference. The method uses a metric M (having a value that is large when there is strong interference) to gauge whether or not to process an incoming signal burst using a processing path (14a–16a) including a module implementing a SAIC algorithm or instead to process the incoming signal burst using a conventional equalizer processing path (14b–16b). A selector module (13) selects one or the other path based on comparing the metric M with a threshold δ. Various metrics M are possible.

8 Claims, 2 Drawing Sheets

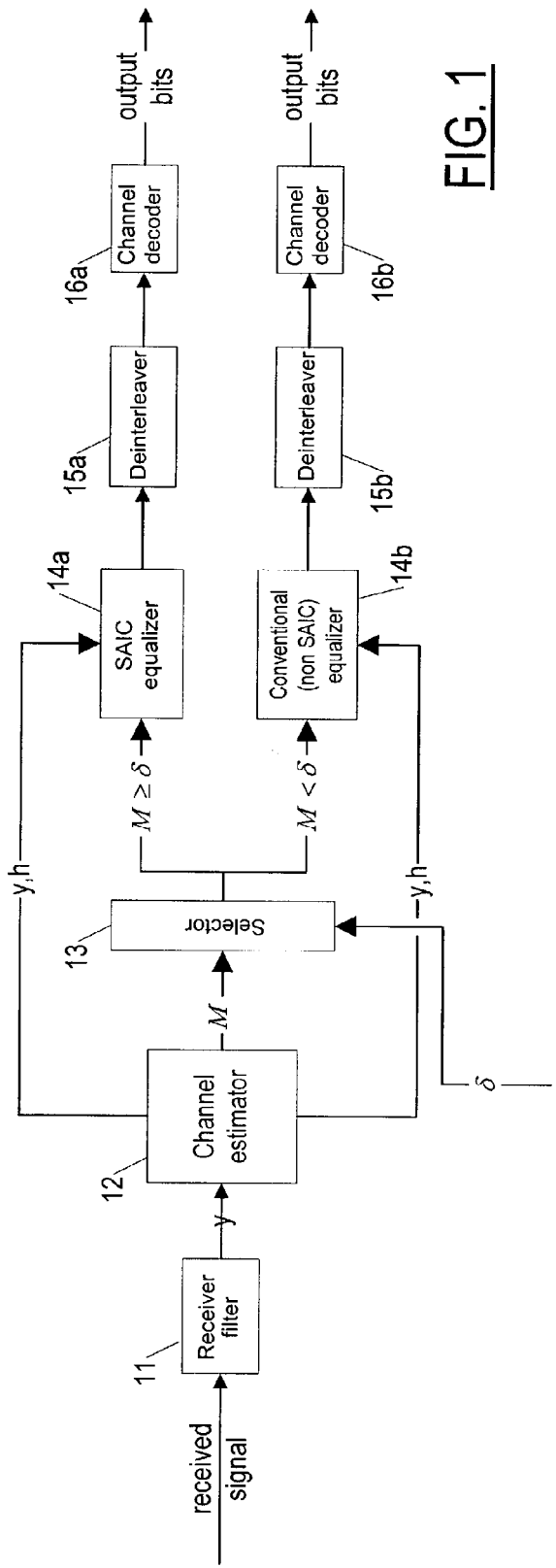
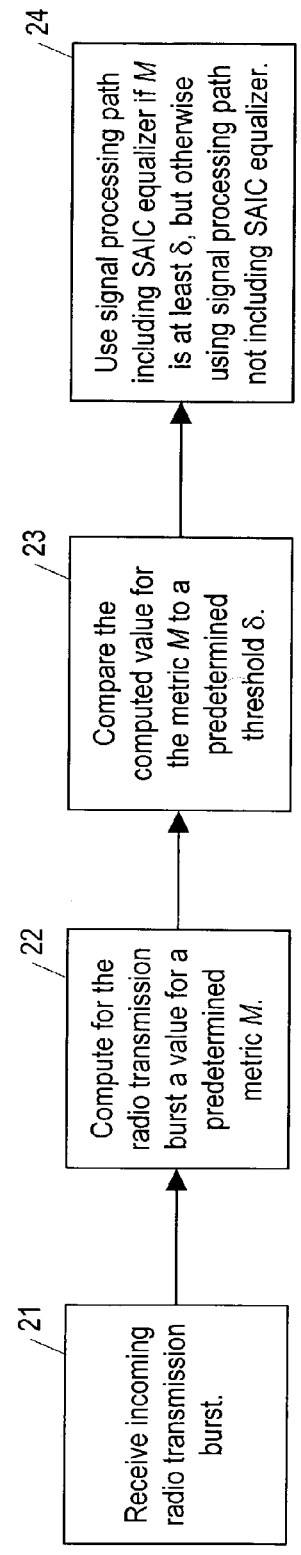

METHOD AND APPARATUS FOR SWITCHING ON AND OFF INTERFERENCE CANCELLATION IN A RECEIVER

TECHNICAL FIELD

The present invention pertains to the field of cellular telephony receivers. More particularly, the present invention pertains to canceling interference in a cellular network receiver, and especially a receiver of a mobile telephone.

BACKGROUND ART

Mobile terminals using cellular networks often experience interference from various sources or due to various causes, such as interference caused by the same signal arriving at the mobile terminal at slightly different times after having propagated along different paths, i.e. so-called multipath interference. As is known, it is often possible to cancel interfering signals at a receiver, and the prior art teaches various methods of interference cancellation (IC), both at mobile terminals and at base stations. Mobile terminals often implement so-called single antenna interference cancellation (SAIC) algorithms, since physical constraints make it difficult to use more than one antenna in providing IC. A SAIC algorithm estimates and removes the effect of interference from a received signal. SAIC algorithms are divided into joint detection SAIC algorithms, which use a known training sequence for the interfering signal, and blind or semi-blind SAIC algorithms.

Using a SAIC algorithm does improve performance in the presence of interfering signals, but a general drawback of SAIC algorithms is that in the absence of strong interference, a SAIC algorithm tends to enhance noise (because of errors in estimating the interfering signal) and so tends to degrade receiver performance compared to a non-SAIC conventional receiver. Also the presence of several interfering signals or severe multipath components can degrade the performance of a SAIC receiver.

What is needed is a way to implement a SAIC algorithm in a receiver so that the SAIC algorithm is used ideally only when it would improve performance.

DISCLOSURE OF THE INVENTION

Accordingly, in a first aspect of the invention, a method is provided for use by a receiver of a wireless communication system, the method including a step of receiving a radio transmission burst, the method characterized by: a step of calculating for the radio transmission burst a value for a predetermined metric M; and a step of selecting either a signal processing path including equalization using single antenna interference cancellation or a signal processing path including equalization without single antenna interference cancellation, the selecting being based on comparing the value for the predetermined metric M to a predetermined threshold δ.

In accord with the first aspect of the invention, the single antenna interference cancellation may be according to a blind or semi-blind single antenna interference cancellation algorithm.

Also in accord with the first aspect of the invention, the single antenna interference cancellation may be according to a joint detection single antenna interference cancellation algorithm.

Also in accord with the first aspect of the invention, the predetermined metric M may be based on the mean squared interference envelope divided by the residual interference plus noise power during the transmission burst. Further, the predetermined metric M may be based on the quotient $\bar{e}^2/J_{min}$, where $\bar{e}^2$ is the mean squared interference envelope, and $J_{min}$ is the minimum of the cost function corresponding to the power of the residual interference and noise.

Still also in accord with the first aspect of the invention, the predetermined metric M may be based on a carrier to interference ratio.

Even still also in accord with the first aspect of the invention, the predetermined metric M may be based on a dominant-to-rest of interference ratio.

In a second aspect of the invention, a receiver is provided for use as part of or for communication with a wireless communication system, and comprising means for performing the steps of a method according to the first aspect of the invention.

In accord with the second aspect of the invention, the receiver may be part of a mobile station.

Also in accord with the second aspect of the invention, the receiver may be part of a base station of a radio access network of the wireless communication system.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram of components of a receiver according to the invention;

FIG. 2 is a flowchart showing a method of operation of a receiver according to the invention;

BEST MODE FOR CARRYING OUT THE INVENTION

Figure 3:
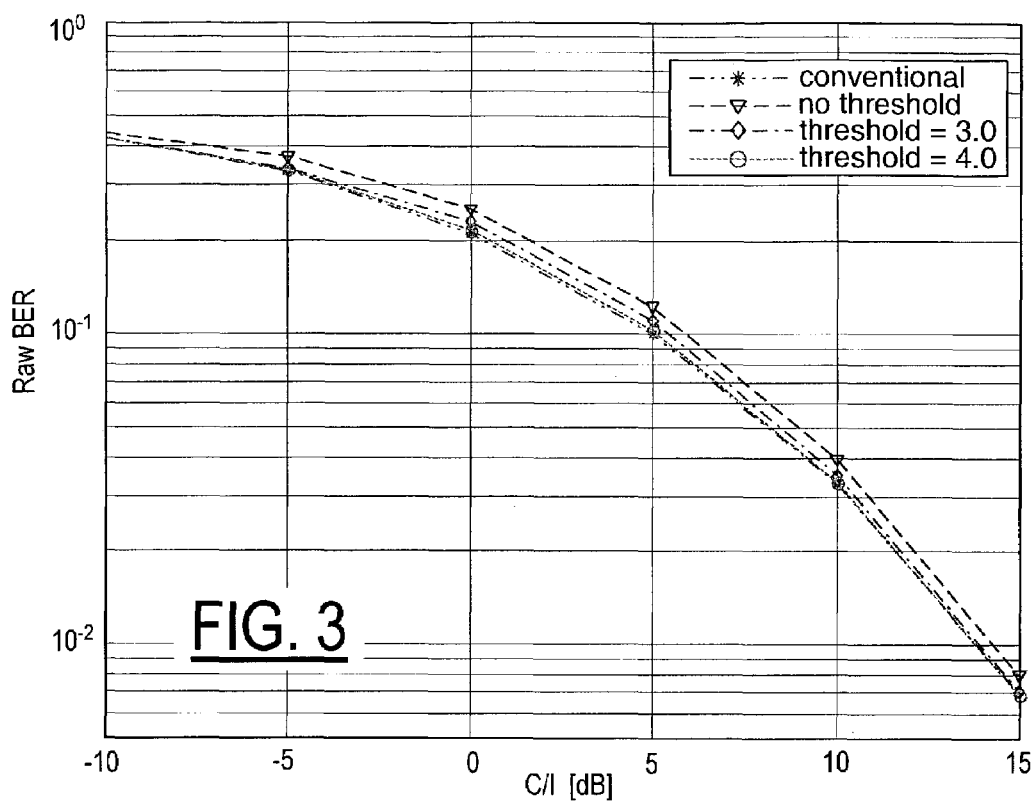
FIG. 3 is a graph showing performance of a receiver according to the invention, in the presence of noise (no interference)

Referring now to FIG. 1, a cellular network receiver according to the invention is shown as including a receiver filter 11 (typically a finite impulse response matched filter), which provides a filtered (baseband) waveform γ (a series of symbols, each possibly representing several possibly interleaved bits). The receiver filter 11 is followed by a channel estimator 12, such as e.g. a constant modulus channel estimator, which assumes constant modulus (constant signal power) for any interfering signals. The channel estimator provides the tap values (the values of the components of the channel impulse response h) of a transversal filter, given the input y, and also provides a value for a metric M, based on h and y, to a selector module 13 that selects (in what is here called adaptive interference cancellation (IC) switch-off) either an SAIC equalizer processing path 14a 15a 16a or a conventional (non-SAIC) equalizer processing path 14b 15b 16b for each transmission burst (frame) of received signal based on comparing the metric M (large in the presence of a single dominant interfering signal) with a predetermined threshold δ. More specifically, the selector module 13 selects the SAIC equalizer processing path 14a–16a only when conditions are favorable for using interference cancellation, according to the metric M (as compared to the threshold δ), as e.g. in the presence of a strong interfering signal, and otherwise selects the signal processing path 14b–16b including the conventional (non-SAIC) equalizer, which is usually an equalizer that minimizes either the sequence error probability, in what is called Maximum-Likelihood Sequence Estimation (MLSE), or the symbol error probability, in what is called Maximum A Posteriori (MAP) equalizer.

The invention can be implemented to use either a blind SAIC algorithm or a joint detection SAIC algorithm. The blind SAIC algorithm can be based e.g., on an assumed constant modulus (CM) property (i.e. constant signal power or, equivalently, constant envelope) of the interfering signal, and minimizes a cost function $J_d(a)$ (with subscript d referring to 'detector', since another cost function is also used, but associated with a channel estimator) calculated using:

$$J_d(a) = \sum_{k=1}^{K}\left[\left|y_k - \sum_{l=0}^{L} a_{k-l} h_l\right|^2 - \bar{e}^2\right]^2, \quad (1)$$

where K is the number of symbols in the burst, where L+1 is the number of estimated channel impulse response taps, where the $y_k$ are the received samples (symbols), where the $a_k$ are the transmitted symbols (which the detector tries to determine from the received samples $y_k$) and the minimization of the cost function is done with respect to the vector a (having as its components K transmitted symbols $a_k$), and where the $h_k$ are the channel impulse response taps (so that the output of the transversal filter representing the channel having as inputs the transmitted samples $a_k$ are the noisy received samples $$y_k = \sum_{l=0}^{L} a_{k-l} h_l + n_k,$$

where $n_k$ are thermal noise samples), and where $\bar{e}^2$ denotes the mean squared interference envelope, which can be estimated with the aid of a known training sequence of bits $m_k$ (included in the middle of each transmission burst) as follows:

$$\bar{e}^2 = \frac{1}{P}\sum_{k=1}^{P}\left|y_k - \sum_{l=0}^{L} m_{k-l} h_l\right|^2. \quad (2)$$

The channel impulse response h is estimated (i.e. the taps $h_k$ are estimated) by first calculating a channel estimator cost $J_{ch}(h)$ using the known training sequence of bits $m_k$ as follows, $$J_{ch}(h) = \sum_{k=1}^{P}\left[\left|y_k - \sum_{l=0}^{L} m_{k-l} h_l\right|^2 - \bar{e}^2\right]^2, \quad (3)$$

and then determining the channel impulse response $\hat{h}$ (i.e. determining the set of taps $\hat{h}_k$) that minimizes the cost function given by eq. (3), i.e. determining $\hat{h}$ according to:

$$\hat{h} = \arg\min_h J_{ch}(h), \quad (4)$$

in which the symbology $$\arg\min_x f(x)$$

indicates the argument x that minimizes the function $f(x)$.

Now, in the preferred embodiment, if blind constant modulus SAIC detection is used in the SAIC processing path 14a–16a, the metric M is calculated by the channel estimator 12 so as to be given by:

$$M = \bar{e}^2/J_{min} \text{ (for blind SAIC)} \quad (5)$$

where $$J_{min} = \min J_{ch}(h) \quad (5a)$$

is the minimum of the channel estimator cost $J_{ch}(h)$, given by eq. (3). The value of the metric M given by eq. (5) is large when there is a strong dominant interfering signal with constant envelope, since in such a case $\bar{e}^2$ is large and $J_{min}$ is small.

In the preferred embodiment, if joint detection SAIC is used in the SAIC processing path 14a–16a (instead of blind SAIC detection), the channel estimator 12 calculates a so-called dominant-to-rest-of-interference ratio (DIR), given by $$DIR = I_{dom}/(I_{total} - I_{dom} + N_0) \quad (6)$$

in which $I_{dom}$ is the dominant received interfering intensity, $I_{total}$ is the total received interfering intensity, and $N_0$ is the noise intensity, and uses DIR as the metric M, i.e.

$$M = DIR \text{ (for joint detection SAIC)}. \quad (7)$$

The value of the metric M given by eq. (7) is again large when there is a strong dominant interfering signal. An estimate of the DIR (defined by eq. (6)) can be made based on known training sequences, one for the desired signal and one for the interfering signal. To do so, the joint least-squares (LS) estimates for the desired and interfering channel impulse responses are estimated (i.e. the taps $h_k^{(1)}$ and $h_k^{(2)}$ are estimated) by first calculating a channel estimator cost $J_{ch}(h^{(1)}, h^{(2)})$ using known training sequences of bits $m_k^{(1)}$ (for the desired signal) and $m_k^{(2)}$ (for the interfering signal), as follows:

$$J_{ch}(h^{(1)}, h^{(2)}) = \sum_{k=1}^{P}\left|y_k - \sum_{l=0}^{L} m_{k-l}^{(1)} h_l^{(1)} - \sum_{l=0}^{L} m_{k-l}^{(2)} h_l^{(2)}\right|^2, \quad (8)$$

and then determining the channel impulse responses $\hat{h}^{(1)}$ and $\hat{h}^{(2)}$ (i.e. determining the set of taps $\hat{h}_k^{(1)}$ and $\hat{h}_k^{(2)}$) that minimizes the cost function given by eq. (9):

$$\hat{h}^{(1)}, \hat{h}^{(2)} = \arg\min_{h^{(1)}, h^{(2)}} J_{ch}(h^{(1)}, h^{(2)}). \quad (9)$$

The metric M is then defined to be the DIR, which is estimated as follows:

$$M \equiv DIR \approx \Sigma [\hbar_k^{(2)}]^2 / J_{min}(h^{(1)}, h^{(2)}) \quad (10)$$

where $$J_{min}(h^{(1)}, h^{(2)}) = \min J_{ch}(h^{(1)}, h^{(2)}). \quad (11)$$

With the metric M determined, the selector module 13 uses a predetermined threshold δ, and selects either the SAIC processing path 14a–16a or the conventional equalizer processing path 14b–16b according to the rule:

If $M \geq \delta$, use SAIC equalizer; else use conventional equalizer. (12)

The threshold is typically determined experimentally, with the aim of achieving a good trade-off between cases with and without interference. The same threshold can be used in many situations, and so there is usually no need to change it during operation. However, if for instance the environment becomes very much noise-limited (as opposed to being interference-limited), the threshold can be increased to avoid SAIC processing even more.

The value of the threshold depends on the metric being used. Blind CM-SAIC utilizes eq. (5), and a typical suitable corresponding threshold is in the range of 3–4. Joint detection, on the other hand, utilizes as the metric the DIR estimate, as set out in eq. (7), and for such a metric, a typical threshold is usually in the range of 2–5.

In the preferred embodiment then, the criterion (used by the selector module 11) is whether or not the metric M, per either eq. (5) or eq. (7), is greater than or at least equal to a predetermined threshold value δ, and if so, i.e. if the criterion is met, then the selector module 11 uses the IC processing path 14a–16a, but otherwise uses the conventional equalizer processing path 14b–16b.

Referring now to FIG. 2, a method for operating a receiver is shown as having a first step 21, the receiver receives an incoming radio transmission burst. In a next step 22, the receiver (and in particular the channel estimator 12) computes for the radio transmission burst a value for a predetermined metric M. In a next step 23, the receiver (and in particular the selector 13) compares the computed value for the metric M to a predetermined threshold δ. In a next step 24, the receiver (and in particular the selector 13) directs the filtered received signal to a signal processing path including an SAIC equalizer if the value for the metric M is at least δ, but otherwise directs the filtered received signal to a signal processing path not including an SAIC equalizer, but including typically a conventional, non-SAIC equalizer.

Figure 4:
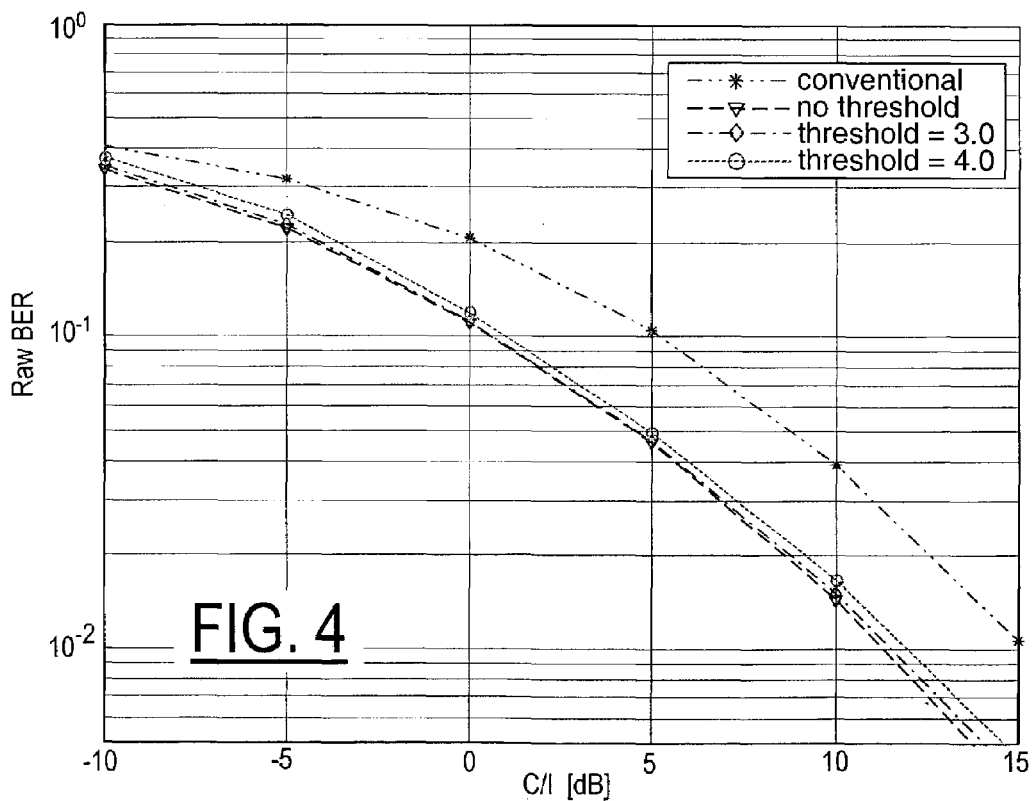
FIG. 4 is a graph showing performance of a receiver according to the invention, in the presence of single co-channel interference.

Referring now to FIGS. 3 and 4, performance of a receiver according to the invention and having the modules in FIG. 1 is indicated for an EGPRS (Enhanced General Packet Radio System)/MCS-1 (Modulation and Coding Scheme 1) system as a graph of raw bit error rate (BER) vs. Signal-to-Noise Ratio (SNR) in FIG. 3 and Carrier-to-Interference Ratio (C/I) in FIG. 4. The former represents the absence of interference and the latter the presence of a single interfering signal. The SAIC equalizer 14a is a 16-state max-log-MAP (Maximum A Posteriori) equalizer and uses the cost function given by Eq. (1); the conventional reference equalizer uses Euclidean distance metrics. The channel estimator 12 uses the rule (8) to select between the SAIC processing path 14a–16a and the conventional equalizer path 14b–16b; in applying the rule (12), the metric M is calculated according to eq. (5). In FIG. 3 there is no interference to remove, so performance loss is expected to be caused by using SAIC. However, in FIG. 4 a large performance gain can be achieved by using SAIC.

Still referring to FIGS. 3 and 4, four curves are presented for each case: performance for a receiver not using SAIC at all or, equivalently, with a threshold δ very large; performance for a receiver using pure SAIC, i.e. without switching on and off (or, equivalently, with a threshold δ=0.0); and two adaptive SAIC curves (switching SAIC on and off for each burst separately, depending on the threshold) with respective thresholds of δ=3.0 and δ=4.0. In the case of no interference (FIG. 3), the conventional curve (no SAIC at all) is 2.5-3 dB better than the SAIC-always-on (pure SAIC) performance curve, but adaptive SAIC with δ=4.0 provides a performance curve essentially equal to the conventional curve. On the other hand, in the case of a strong single interfering signal (favoring the use of SAIC, i.e. favoring an always-on SAIC receiver), as shown in FIG. 4, the same threshold of δ=4.0 causes only a small degradation from the best possible improvement (pure SAIC), especially in the interesting range of raw BER between $10^{-2}$ and $10^{-1}$.

The invention also encompasses other metrics M, besides those given generally by eqs. (5) and (7). As an example, the metric M can be defined to be the inverse of the carrier to interference ratio C/I, which in blind SAIC can be estimated as, $$C/I \approx \Sigma \hbar_k^2 / e^2,$$

and in joint detection SAIC as, $$C/I \approx \Sigma(\hbar_k^{(1)})^2 / (\hbar_k^{(2)})^2,$$

and a metric M can be taken to be, $$M = \frac{1}{C/I}. \quad (13)$$

Furthermore, a metric can be derived from a combination of DIR and C/I estimates.

The invention has been shown and described using as a predetermined metric M a quantity that is large in case of a strong interfering signal, but of course the invention could also be implemented using as a predetermined metric M a quantity that is small in case of a strong interfering signal, in which case the rule (8) would be replaced by a rule which selects the SAIC processing path 14a–16a only if (the differently defined) M is less than a threshold δ.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a receiver of a wireless communication system, the method including a step (21) of receiving a radio transmission burst, the method characterized by:

a step (22) of calculating for the radio transmission burst a value for a predetermined metric M; and a step (23–24) of selecting either a signal processing path including equalization using single antenna interference cancellation or a signal processing path including equalization without single antenna interference cancellation, the selecting being based on comparing the value for the predetermined metric M to a predetermined threshold δ;

wherein the predetermined metric M is based on a mean squared interference envelope during the radio transmission burst.

2. A method as in claim 1, wherein the single antenna interference cancellation is according to a blind or semi-blind single antenna interference cancellation algorithm.

3. A method as in claim 1, wherein the single antenna interference cancellation is according to a joint detection single antenna interference cancellation algorithm.

4. A method as in claim 1, wherein the predetermined metric M is based on the mean squared interference envelope divided by the residual interference plus noise power during the transmission burst.

5. A method as in claim 4, wherein the predetermined metric M is based on the quotient $\overline{e^2}/J_{min}$, where $\overline{e^2}$ is the mean squared interference envelope, and $J_{min}$ is the minimum of the cost function corresponding to the power of the residual interference and noise.

6. A receiver used as part of or with a wireless communication system, comprising means for performing the steps recited in claim 1.

7. A receiver as in claim 6, wherein the receiver is part of a mobile station.

8. A receiver as in claim 6, wherein the receiver is part of a base station of a radio access network of the wireless communication system.

* * * * *